(12) United States Patent
Sumner et al.

(10) Patent No.: US 6,533,243 B1
(45) Date of Patent: Mar. 18, 2003

(54) SELF-CLOSING VALVE

(76) Inventors: Wallace Maurice Sumner, 1697 Hillside St., Marietta, GA (US) 30066; Carlis Louis Shumake, Jr., 4106 Arapaho Ct., Powder Springs, GA (US) 30127

( * ) Notice: Subject to any disclaimer, the term of this patent is extended or adjusted under 35 U.S.C. 154(b) by 0 days.

(21) Appl. No.: 10/038,716

(22) Filed: Jan. 2, 2002

(51) Int. Cl.⁷ .............................................. F16K 21/12
(52) U.S. Cl. ...................................... 251/313; 251/303
(58) Field of Search .................................. 251/303, 313

(56) References Cited

U.S. PATENT DOCUMENTS

| | | | | |
|---|---|---|---|---|
| 1,095,295 A | * | 5/1914 | Stevens | 251/213 |
| 1,223,353 A | * | 4/1917 | Angell | 251/213 |
| 1,467,615 A | * | 9/1923 | Fairbanks | 251/213 |
| 1,631,166 A | * | 6/1927 | Sprague | 251/213 |
| 2,505,145 A | * | 4/1950 | Ryan | 251/213 |
| 2,609,870 A | * | 9/1952 | Riebman et al. | 251/213 |
| 4,092,085 A | * | 5/1978 | McMaster-Christie | 251/213 |
| 4,270,849 A | | 6/1981 | Kalbfleisch | |
| 4,779,840 A | | 10/1988 | Andrea | |
| 4,938,453 A | | 7/1990 | Blanchard | |
| 6,206,337 B1 | | 3/2001 | Veillet, Jr. | |
| 6,253,785 B1 | | 7/2001 | Shumake, Jr. | |

* cited by examiner

Primary Examiner—Paul J. Hirsch

(57) ABSTRACT

A simple and inexpensive self-closing spring-loaded ball valve assembly that can be latched in the valve open position and consequentially triggered to automatically close and shut off the flow of fluid therethrough.

2 Claims, 2 Drawing Sheets

SELF-CLOSING VALVE

CROSS-REFERENCES TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING", A TABLE, OR A COMPUTER PROGRAM LISTING APPENDIX SUBMITTED ON A COMPACT DISC

Not applicable.

BACKGROUND OF THE INVENTION

The present invention relates to a fluid supply shut-off valve that automatically closes when its spring-loaded handle and latching mechanism are triggered. This invention references the following U.S. patent classifications as fields of endeavor:
CLASS 251 Valves and Valve Actuation
CLASS 137 Fluid Handling A need exists for a practical, compact, inexpensive and "simple to manufacture" self-closing ball valve that, without the use of any electrical power, will automatically shut off the flow of fluid therethrough when its biased handle is triggered to allow valve closure. This need is reflected in our prior art U.S. Pat. No. 6,253,785. FIG. 1 of said prior art is a self-closing ball valve assembly, but the capped riser pipe 31, spring wheel 30 and spring 28 depicted are not practically desirable or economic. Said assembly also requires a considerable amount of space for its installation and operation.

Prior art U.S. Pat. No. 4,938,453 is also self-closing but strictly by manual release means only. It is not equipped with a means for latching its biased handle in the valve open position nor equipped with a means to trigger automatic valve closure. Said prior art also requires the addition of a costly and unnecessary mounting pad on the valve body in order to attach its hardware.

The invention disclosed herewith is practical, compact, simple, economic, and non-electric and is superior over the prior art.

BRIEF SUMMARY OF THE INVENTION

The purpose of this invention is to economically render a typical prior art ball valve and its handle into a self-closing spring-loaded ball valve that can be latched in the valve open position and consequently triggered to automatically close and shut off the flow of fluid therethrough. Our U.S. Pat. No. 6,253,785 is an application where the present invention is needed and can be applied. The present invention is fabricated and assembled using "off the shelf" parts and materials that can be found in a typical hardware store. The present invention does not require a new manufactured ball valve body or handle. No hardware-mounting pad on the valve body is required. Hence minimal capital is required for tooling and production. An entire valve, handle and latch assembly can be fabricated in very short time and very economically. Clearly this invention is a significant improvement and an advantage over the prior art.

DETAILED DESCRIPTION OF THE INVENTION

Figure 1:
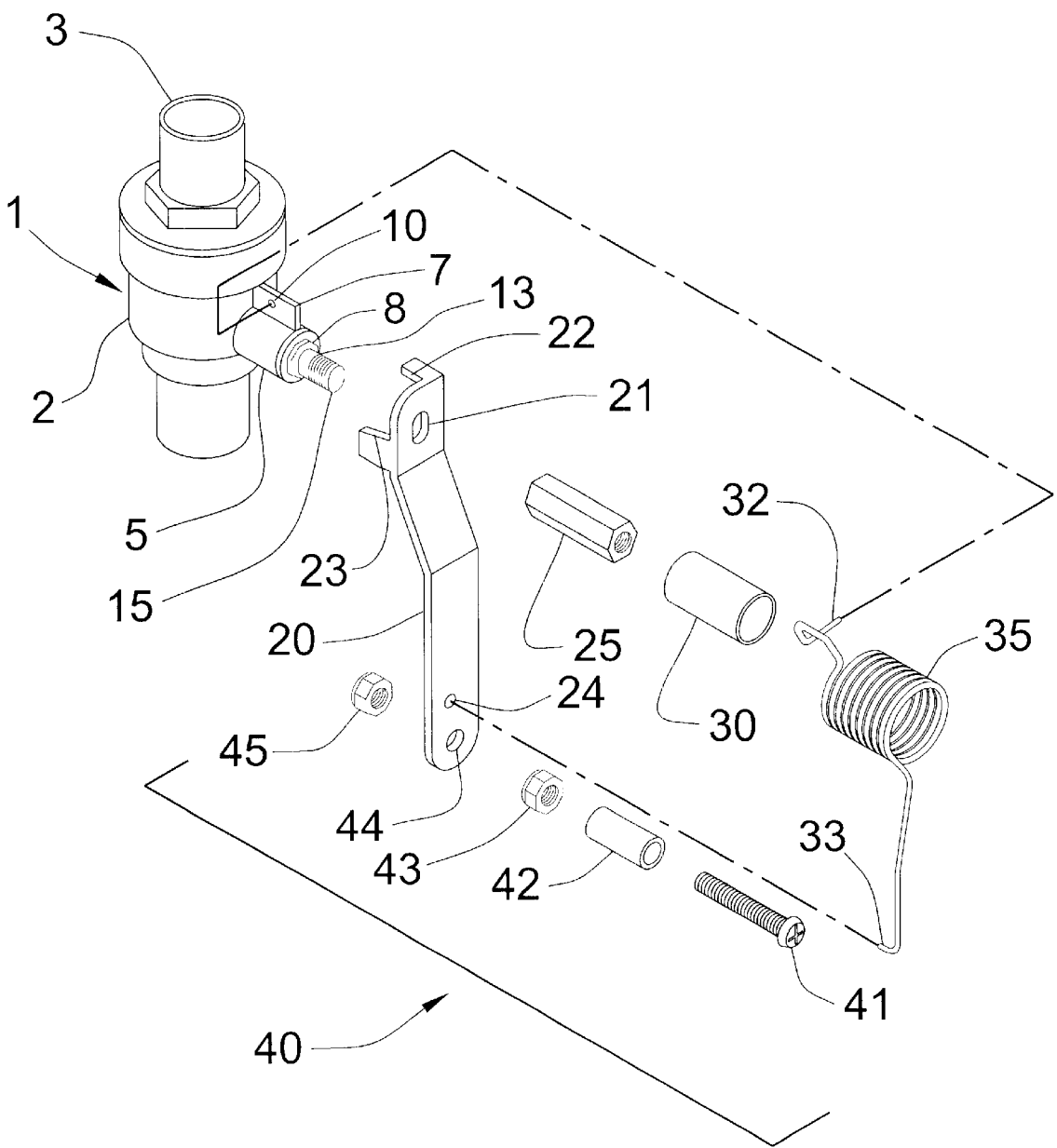
FIG. 1 is an exploded view of the present invention.

FIG. 1 shows a typical prior art quarter-turn ball valve, generally referenced as 1, comprised of a valve body 2, a valve stem housing 5, a valve stem 13 and a handle 20. Valve body 2 has a typical longitudinal conduit 3 extending completely therethrough for allowing fluid to flow through. Known to those who are skilled in the art, a ball headed member (not shown) is positioned within longitudinal conduit 3 and is movable between a first position which blocks flow through ball valve 1, and a second position which allows flow through ball valve 1. Attached to the ball headed member is valve stem 13. Valve stem 13 extends from valve body 2 through a valve stem housing 5 and is then secured with a packing nut 8. Valve stem 13 terminates as a threaded stem end 15. Handle 20 shown here in the valve open position is attached to valve stem 13 by passing stem end 15 through a handle mounting hole 21 and then ordinarily securing with a hex nut (not shown). Handle 20 is used to rotate valve stem 13 and its ball headed member in order to control the flow of fluid therethrough. Handle 20 has a stub 22 and a stub 23. Rotation of handle 20 is limited to 90 degrees of travel by the abutment of stubs 22 and 23 against a typical rotation limiting flange stop 7. In lieu of a hex nut, handle 20 of the present invention is secured to stem end 15 with a female threaded tubular member such as a standard rod-coupling nut 25. A spring support sleeve 30, such as a standard bearing is fitted over coupling nut 25. A torsion spring coil 35 is fitted over spring support sleeve 30. A spring end anchor hole 10 is drilled through flange stop 7. A first protruding spring end 32 can now be anchored to valve body 2 at valve stem housing 5 by inserting spring end 32 into anchor hole 10. A spring end anchor hole 24 is drilled through handle 20. A second protruding spring end 33 can now be anchored to handle 20 by inserting spring end 33 into anchor hole 24. A latch assembly generally referenced as 40 is comprised of a latch bolt 41, a roller bearing 42, a stop nut 43, a drilled hole 44 through handle 20 and a stop nut 45. Latch bolt 41 is inserted through bearing 42 and then secured with stop nut 43 leaving bearing 42 free to rotate around latch bolt 41. Latch bolt 41 is then inserted through hole 44 and secured with stop nut 45.

Figure 2:
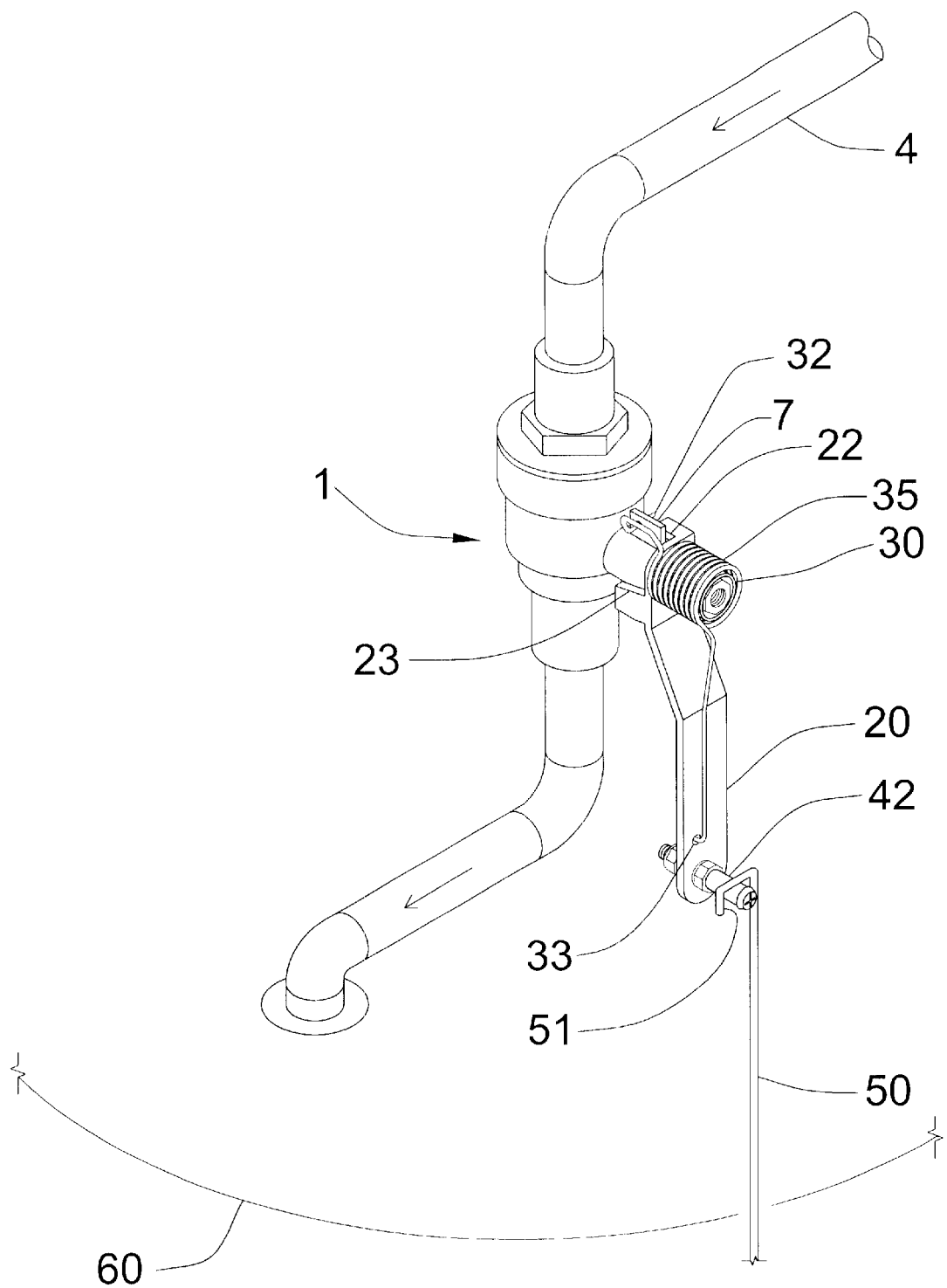
FIG. 2 is a perspective view of the present invention fully assembled and latched in the valve open position ready for operation.

FIG. 2 is an example of the present invention shown installed in a water supply line 4 that supplies water to a water heater storage tank 60. In this example water heater storage tank 60 is equipped with a leak detection triggering means, such as shown in our U.S. Pat. No. 6,253,785, that will cause a hooked member 50 to travel upward when activated. With spring end 32 anchored, handle 20 is manually rotated to the valve open position as shown, forcing anchored spring end 33 to travel alongside accordingly. During this said rotation, torsion spring cod 35 compresses around spring support sleeve 30 resulting in the creation of considerable tension in the torsion spring coil. Handle 20 completes a 90-degree rotation to the valve open position once stub 22 abuts against flange stop 7. In this valve open position water is allowed to flow from water supply line 4 into water heater storage tank 60. Handle 20 is maintained or "latched" in this valve open position by hooking the hooked member 50 over roller bearing 42. The present invention is now in the "spring-loaded" or "self-closing" position. When hooked member 50 is activated to travel upward, a hooked member face 51 simultaneously travels up sliding against roller bearing 42 eventually clearing and freeing handle 20 to yield to the tension of torsion spring coil 35 thus forcing stub 23 to abut against flange stop 7. The present invention has now "self-closed" automatically shutting off the flow of fluid therethrough. An operator may return this invention back to the valve open position when so desired.

We claim:

1. An apparatus for rendering a typical ball valve as a self-closing ball valve, comprising:

an elongated handle member whereby a quarter-turn rotation thereof controls the flow of fluid through said ball valve a female threaded tubular member for fastening said elongated handle member to a threaded valve stem portion of said ball valve a tubular sleeve rotatably fitting over said female threaded tubular member a torsion spring coil rotatably fitting over said tubular sleeve a means for anchoring a first protruding end of said torsion spring coil to a valve body of said ball valve a means for anchoring an opposing second protruding end of said torsion spring coil to a first distant end of said elongated handle member.

2. The apparatus of claim 1 wherein said elongated handle member includes a latching mechanism that can be latched and then triggered to allow automatic valve closure, comprising:

a tubular sleeve rotatably mounted on ax axle a means for fastening said axle to a second distant end of said elongated handle member.

* * * * *